United States Patent
Dalal et al.

(10) Patent No.: US 9,384,052 B2
(45) Date of Patent: Jul. 5, 2016

(54) RESILIENT MESSAGE PASSING IN APPLICATIONS EXECUTING SEPARATE THREADS IN A PLURALITY OF VIRTUAL COMPUTE NODES

(75) Inventors: Danny Dalal, Kirkland, WA (US); Marco Mura, Iglesias (IT)

(73) Assignee: Microsoft Technology Licensing, LLC, Redmond, WA (US)

( * ) Notice: Subject to any disclaimer, the term of this patent is extended or adjusted under 35 U.S.C. 154(b) by 1012 days.

(21) Appl. No.: 12/972,545

(22) Filed: Dec. 20, 2010

(65) Prior Publication Data
US 2012/0159505 A1 Jun. 21, 2012

(51) Int. Cl.
*G06F 9/46* (2006.01)
*G06F 9/50* (2006.01)

(52) U.S. Cl.
CPC ........ *G06F 9/5027* (2013.01); *G06F 2209/547* (2013.01)

(58) Field of Classification Search
None
See application file for complete search history.

(56) References Cited

U.S. PATENT DOCUMENTS

| | | | | |
|---|---|---|---|---|
| 5,727,210 | A * | 3/1998 | Dwork et al. | 718/104 |
| 7,769,802 | B2 * | 8/2010 | Smith et al. | 709/201 |
| 8,370,495 | B2 * | 2/2013 | Jackson | 709/226 |
| 2003/0154284 | A1 * | 8/2003 | Bernardin et al. | 709/226 |
| 2005/0120160 | A1 * | 6/2005 | Plouffe et al. | 711/1 |
| 2007/0174655 | A1 * | 7/2007 | Brown et al. | 714/2 |
| 2008/0034371 | A1 * | 2/2008 | Gustafson et al. | 718/106 |
| 2008/0098194 | A1 * | 4/2008 | Hashimoto et al. | 711/173 |
| 2009/0043988 | A1 * | 2/2009 | Archer et al. | 712/31 |
| 2009/0067334 | A1 | 3/2009 | Archer et al. | |
| 2009/0320026 | A1 * | 12/2009 | Moler | 718/100 |

OTHER PUBLICATIONS

Ramos et al., "High-Performance, Dependable Multiprocessor", Retrieved at << http://nmp.nasa.gov/st8/tech_papers/IEEE%202006%20Aerospace%20Paper%201511%20NASA%20EPO.pdf >>, Proceedings of the 2006 IEEE Aerospace Conference, Mar. 6, 2006, pp. 1-13.

Cao et al., "Process Migration for MPI Applications based on Coordinated Checkpoint", Retrieved at << http://repository.lib.polyu.edu.hk/jspui/bitstream/10397/844/1/coordinated-checkpoint_05.pdf >>, Proceedings of the 11th International Conference on Parallel and Distributed Systems, 2005, pp. 7.

Sankaran et al., "Parallel Checkpoint/Restart for MPI Applications", Retrieved at << http://crd.lbl.gov/~jcduell/papers/cr.pdf >>, 2008, pp. 1-12.

Wang et al., "Proactive Process-Level Live Migration in HPC Environments", Retrieved at << http://ieeexplore.ieee.org/stamp/stamp.jsp?arnumber=05222634 >>, 2008, pp. 12.

(Continued)

*Primary Examiner* — Eric C Wai
(74) *Attorney, Agent, or Firm* — Alin Corie; Sandy Swain; Micky Minhas

(57) ABSTRACT

A message passing system may execute a parallel application on multiple compute nodes. Each compute node may perform a single workload on at least two physical computing resources. Messages may be passed from one compute node to another, and each physical computing resource assigned to a compute node may receive and process the messages. In some embodiments, the compute nodes may be virtualized so that a message passing system may only detect a single compute node and not the multiple underlying physical computing resources.

20 Claims, 5 Drawing Sheets

(56) References Cited

OTHER PUBLICATIONS

Patchin et al., "Adding the Easy Button to the Cloud with SnowFlock and MPI", Retrieved at << http://andres.lagarcavilla.com/publications/PatchinHPCvirt09.pdf >>, Mar. 31, 2009, pp. 8.

Li et al., "Proactive Fault Manager for High Performance Computing", Retrieved at << /www.cs.iit.edu/~zlan/publications/fast_abstract_dsn05.pdf >>, Proceedings of the International Conference on Dependable Systems and Networks, 2005, pp. 2.

Zhang et al., "A Task Migration Mechanism for MPI Applications", Retrieved at << http://citeseerx.ist.psu.edu/viewdoc/download?doi=10.1.1.38.6921&rep=rep1&type=pdf >>, 2007, pp. 5.

Bouteiller et al., "Coordinated Checkpoint Versus Message Log for Fault Tolerant MPI", Retrieved at << http://ieeexplore.ieee.org/stamp/stamp.jsp?tp=&arnumber=1253321>>, Proceedings 2003 IEEE International Conference on Cluster Computing, Dec. 1-4, 2003, pp. 9.

Bouteiller et al., "MPICH-V2: A Fault Tolerant MPI for Volatile Nodes Based on Pessimistic Sender Based Message Logging", Retrieved at << http://mpich-v.lri.fr/papers/MPICH-V2.pdf >>, SC'03, Nov. 15-21, 2003, pp. 1-17.

Bosilca et al., "MPICH-V: Toward a Scalable Fault Tolerant MPI for Volatile Nodes", Retrieved at << http://citeseerx.ist.psu.edu/viewdoc/download;jsessionid=92D3B014F4F148FD6550E79A8C874E19?doi=10.1.1.19.134&rep=rep1&type=pdf >>, ACM/IEEE 2002 Conference Supercomputing, Nov. 16-22, 2002, pp. 1-18.

Bronevetsky et al., "Automated Application-level Check Pointing of MPI Programs", Retrieved at << http://citeseerx.ist.psu.edu/viewdoc/download?doi=10.1.1.59.6440&rep=rep1&type=pdf >>, Proceedings of the ACM SIGPLAN Symposium on Principles and Practice of Parallel Programming, Jun. 11-13, 2003, pp. 13.

Stellner, Georg., "CoCheck: Checkpointing and Process Migration for MPI", Retrieved at << http://citeseerx.ist.psu.edu/viewdoc/download?doi=10.1.1.4.5240&rep=rep1&type=pdf >>, Proceedings of IPPS '96, The 10th International Parallel Processing Symposium, Apr. 15-19, 1996, pp. 6.

Sankaran, et al., "The LAM/MPI Checkpoint/Restart Framework: System-Initiated Check Pointing", << Retrieved at http://citeseerx.ist.psu.edu/viewdoc/download?doi=10.1.1.110.9068&rep=rep1&type=pdf >>, In Proceedings, LACSI Symposium, 2003, pp. 1-12.

"MPICH2: High-performance and Widely Portable MPI", Retrieved at << http://www.mcs.anl.gov/research/projects/mpich2/ >>, Retrieved Date: Oct. 1, 2010, pp. 1.

"Using Bind or Connect Redirection", Retrieved at << http://msdn.microsoft.com/en-us/library/ff571005(VS.85).aspx >>, Retrieved Date: Oct. 1, 2010, pp. 3.

\* cited by examiner

RESILIENT MESSAGE PASSING IN APPLICATIONS EXECUTING SEPARATE THREADS IN A PLURALITY OF VIRTUAL COMPUTE NODES

BACKGROUND

Many high performance computing systems may use a message passing system to coordinate communications between processors operating in parallel. The message passing system may send data and status between different processors as those processors perform their work.

Applications that use a message passing system often perform complex calculations in parallel. Such applications may be finite element analysis, computational fluid dynamics, complex visual renderings, or other computationally expensive operations. In some cases, the applications may process a single problem for many hours or even days. When a failure occurs due to a hardware or software issue, many such applications may not be able to recover and may then be restarted.

SUMMARY

A message passing system may execute a parallel application on multiple compute nodes. Each compute node may perform a single workload on at least two physical computing resources. Messages may be passed from one compute node to another, and each physical computing resource assigned to a compute node may receive and process the messages. In some embodiments, the compute nodes may be virtualized so that a message passing system may only detect a single compute node and not the multiple underlying physical computing resources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
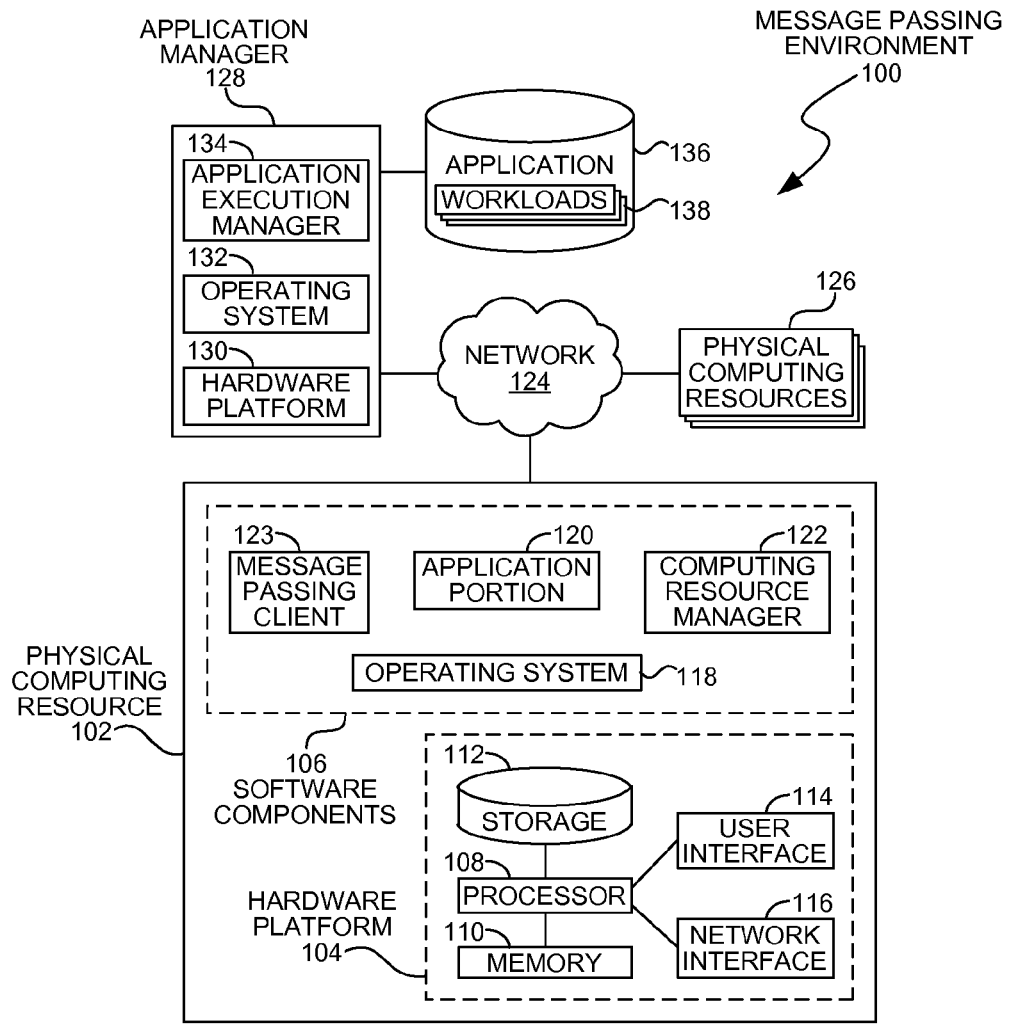
FIG. 1 is a diagram illustration of an embodiment showing a message passing environment for executing parallel applications.

A message passing system may execute a parallel application on multiple compute nodes. Each compute node may perform a single workload on at least two physical computing resources. Multiple computing resources may provide redundancy in the event of failure or one or more computing resources.

In some embodiments, the compute nodes may be virtualized so that a message passing system may not be capable of detecting that multiple physical computing resources may be available for the compute nodes. Such a system may allow an administrator to configure the compute nodes with various degrees of redundancy, which may depend on the available resources, the importance of the application, or other factors.

The physical computing resources assigned to a compute node may execute identical or nearly identical workloads. In the event that one of the physical computing resources fails, the remaining physical computing resource may continue the application.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and maybe accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may execute parallel applications using message passing. Embodiment 100 is a simplified example of a network environment in which multiple independent processors may separately execute execution workloads, and may pass messages between the workloads.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 may be an example of a computational system that may execute applications that execute on separate compute nodes, where each of the compute nodes may execute a separate workload. Examples of such applications may be large finite element analyses, weather prediction analyses, large scale image rendering systems, and other types of computationally expensive applications. Such applications may execute for many hours or even days or weeks, and may use many tens, hundreds, or even thousands of processors operating in parallel.

Such applications may involve a large investment of resources to execute the application. A failure on one or more of the compute nodes may cause the application to fail, and many applications may not be capable of resuming operations from the failed state. In such cases, the application may be restarted from the beginning at a loss of the invested time and resources.

In order to make the applications more resilient to failure, each compute node may be executed by two or more physical computing resources. The physical computing resources may be separate computer systems that may each execute the same or similar workload. If one of the physical computing resources were to fail, the remaining computing resource may continue processing and so that the application may execute to completion.

In some embodiments, the physical computing resources may be separate and distinct computer systems. For example, a physical computing resource may be a standalone server computer that has a separate hardware platform from another physical computing resource.

Within a message passing environment, an application may be executed by several compute nodes. Each compute node may execute a separate workload and messages may be passed between the compute nodes as the application executes. A message passing environment may facilitate the message passing by queuing messages, transmitting messages, and ensuring delivery of the messages. The message payloads may be created by a compute node with an address for another compute node, and the message passing environment may transmit the message to the receiving node.

Embodiment 100 may use two or more physical computing resources to execute each compute node. From the application's standpoint, the application may execute on separate compute nodes, while each compute node may have multiple, independent workloads operating in parallel. The application may be agnostic to the parallel physical computing resources in some cases.

The operations of embodiment 100 may be performed using several different architectures. In one architecture, each compute node may be a separate, independent set of workloads that may have a computing resource manager that may present a single compute node to a message passing environment and may manage the physical computing resources independently of other compute nodes.

Some such embodiments may present a virtualized compute node to a message passing environment. In such embodiments, a virtualized compute node may interface with an existing message passing environment and may present the equivalent of a physical computing resource to a message passing environment, yet be backed by multiple physical computing resources. In such embodiments, the message passing environment may be agnostic to the multiple physical computing resources and may pass individual messages between compute nodes, while each compute node may handle message passing to the individual physical computing resources within the node.

In another embodiment, the message passing environment may be aware of the multiple physical computing resources that make up various compute nodes. In such embodiments, the message passing environment may pass messages from one physical computing resource on one node to multiple physical computing resources on another compute node. In such embodiments, the message passing may be more complex than the embodiment with a virtualized compute node, while the virtualized compute node may have an additional management or virtualization layer between the message passing environment and the physical computing resources.

The physical computing resource 102 may represent one component within a message passing environment. The message passing environment may be created by installing common message passing workloads on each of a plurality of physical computing platforms, where the message passing workloads may operate together to pass messages amongst the computing platforms. In many embodiments, a centralized application manager may setup and control operation of an application that may be performed by the physical computing resources. The physical computing resources may be arranged into virtual compute nodes in some embodiments.

The physical computing resource 102 is illustrated having hardware components 104 and software components 106. The physical computing resource 102 as illustrated represents a conventional server computer, although other embodiments may have different configurations, architectures, or components.

In many embodiments, the physical computing resource 102 may be a server computer. In some embodiments, the physical computing resource 102 may still also be a laptop computer, netbook computer, tablet or slate computer, wireless handset, game console, cellular telephone, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the computing resource 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The software components 106 may include an operating system 118 on which an application portion 120 may execute. The application portion 120 may be a workload within a larger application. A computing resource manager 122 may set up and operate a computing node and may operate in conjunction with another physical computing resource. A message passing client 123 may perform message passing operations with other message passing clients.

Embodiment 100 illustrates components that may operate in different manners for different architectures. For example, in a virtualized compute node architecture, the message passing client 123 may operate as part of a conventional message passing environment, and the computing resource manager 122 may manage a virtualized compute node by communicating with at least one other physical computing resource that may execute the same workload as the application portion 120. In such embodiments, the message passing client 123 and the computing resource manager 122 may be separate and distinct software components.

In another example, the message passing client 123 and computing resource manager 122 may be a single software component that may perform message passing with other physical computing resources as well as manage two or more physical computing resources that may execute the same or similar workloads.

The physical computing resource 102 may be connected to a network 124 to which other physical computing resources 126 may be connected. In some embodiments, the network 124 may be a dedicated high speed network that may facilitate high speed message passing between physical computing resources. In such embodiments, the physical computing resources may be collocated in a datacenter or other facility. In other embodiments, the network 124 may be a dispersed network, such as a local area network, wide area network, or the Internet where the physical computing resources may be located at many different geographical locations.

An application manager 128 may be a physical computing resource that may perform various administrative operations for a message passing application. The application manager 128 may have a hardware platform 130, which may be similar to the hardware components 104. The application manager 128 may have an operating system 132 on which an application execution manager 134 may setup, launch, monitor, and operate an application 136 that may have multiple independent workloads 138.

The application execution manager 134 may configure compute nodes, assign workloads to the compute nodes, and cause the application 136 to be executed. In some cases, the application execution manager 134 may also configure each of the compute nodes with multiple physical computing resources.

The application 136 may be any type of application that may be implemented in multiple workloads 138 that may execute independently. The workloads 138 may communicate with each other using a message passing environment that may be created by message passing clients that interact on the various physical computing resources that execute the workloads.

The workloads 138 may be any type of executable workload that may be performed by a computer processor. In some cases, the workloads 138 may be individual applications, services, processes, threads, or other executable code. In some embodiments, the workloads 138 may be similar or even identical workloads that process different portions of a dataset in parallel.

Figure 2:
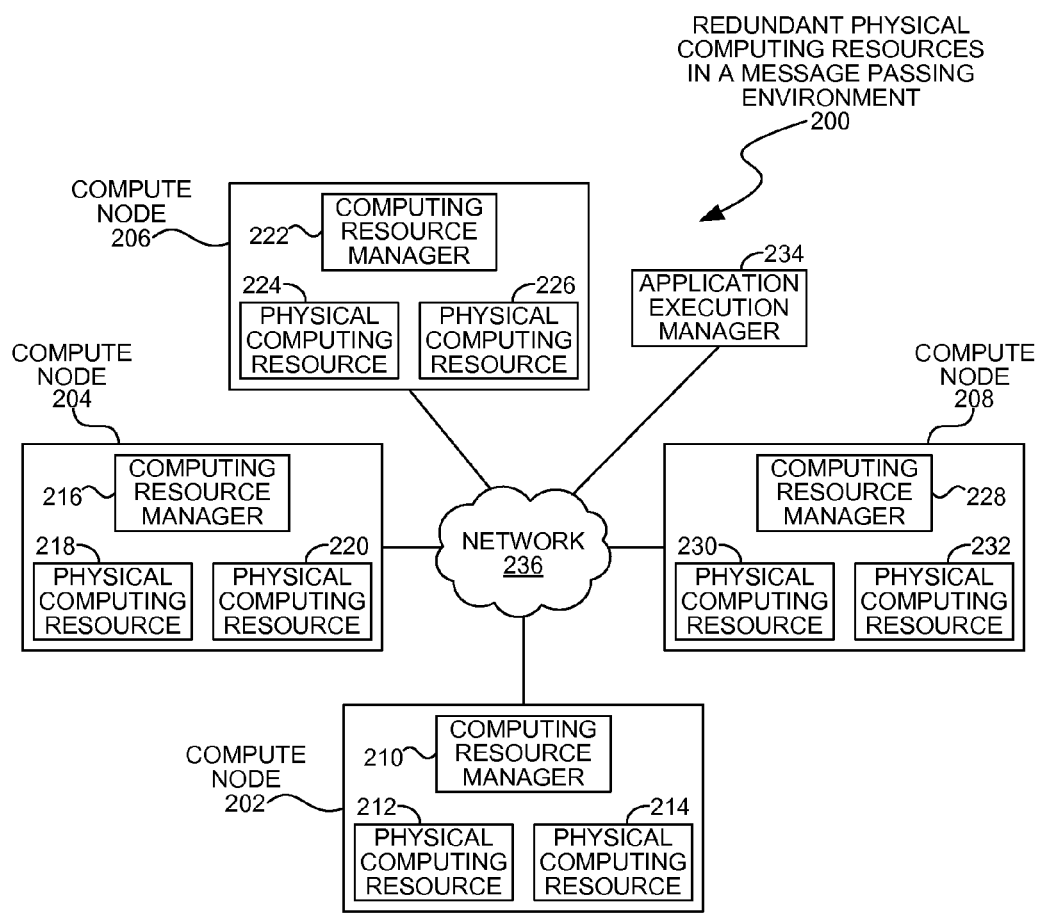
FIG. 2 is a diagram illustration of an embodiment showing a conceptual view of a message passing environment for executing parallel applications.

FIG. 2 is a diagram of an embodiment 200, showing a message passing environment for executing parallel applications. Embodiment 200 is a schematic representation of a message passing environment with multiple physical computing resources for each compute node.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 200 illustrates a conceptual or schematic view of a message passing environment. In the example of embodiment 200, four compute nodes 202, 204, 206, and 208 may execute an application.

Each compute node may execute a single workload on multiple physical computing resources. The compute node 202 may execute the same workload on physical computing resources 212, and 214. Compute node 204 may execute the same workload on physical computing resources 218 and 220. Similarly, compute node 206 may execute the same workload on physical computing resources 224 and 226, and compute node 208 may execute the same workload on physical computing resources 230 and 232.

Each compute node may have a computing resource manager. Compute nodes 202, 204, 206, and 208 may have computing resource managers 210, 216, 222, and 228, respectively. In some embodiments, the computing resource managers may operate on one or both of the associated physical computing resources. In some embodiments, the computing resource managers may operate on a separate hardware platform from the physical computing resources.

An application execution manager 234 may setup, configure, and execute an application across the various compute nodes. The application execution manager 234 may have a user interface through which a user may manage the application, view results, and perform other operational functions.

Embodiment 200 illustrates a conceptual view of a message passing environment where the various compute nodes may be connected through a network 236 to execute an application. In one embodiment, the various compute nodes may operate as single, independent systems whereby messages may be passed between the compute nodes. In such an embodiment, a message may be received by a compute node and a computing resource manager may pass the message to the various workloads being executed on the physical computing resources associated with the compute node.

In such an embodiment, messages may be generated by each physical computing resource. Because two or more physical computing resources may execute the same workload, each of the physical computing resources may generate the same messages to be passed to another compute node. In order to eliminate duplicate outgoing messages, a computing resource manager may manage the messages so that only one outgoing message may be transmitted. An example of such a message passing mechanism may be found in embodiment 400 presented later in this specification.

In another embodiment, the message passing environment may pass messages from each physical computing resource to the corresponding physical computing resource. An example of such a message passing mechanism may be found in embodiment 500 presented later in this specification.

Figure 3:
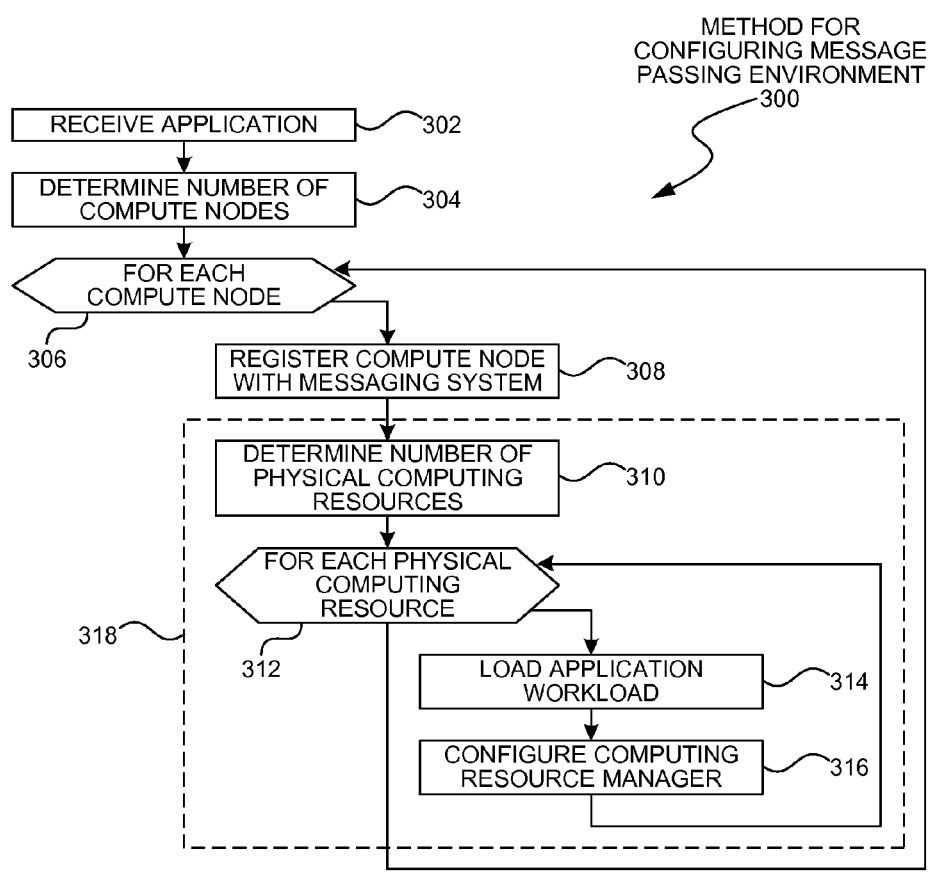
FIG. 3 is a timeline illustration of an embodiment showing a method for configuring a message passing environment.

FIG. 3 is a flow chart illustration of an embodiment 300 showing a method for configuring a message passing environment for executing an application. Embodiment 300 is a simplified example of the operations that may be performed by an applications execution manager during the setup phase of a message passing environment.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates the steps that may be performed across a message passing environment to configure various physical computing resources for executing a parallel application.

The application may be received in block 302. The number of compute nodes for the application may be determined in block 304. In some cases, the number of compute nodes may be varied based on the availability of computing resources. In other cases, an application may have a predefined number of compute nodes.

Each compute node may be processed in block 306. In some embodiments, a compute node may be defined by a computing resource manager that may execute on one or more physical computing resources. In some embodiments, the computing resource manager may execute on one hardware platform while the physical computing resources that execute application workloads may be separate hardware platforms.

For each compute node in block 306, the compute node may be registered with a messaging system in block 308. The registration may involve defining an address for the compute node so that other compute nodes may be able to pass messages to and from the current compute node.

For the compute node, a number of physical computing resources may be defined in block 310. For each physical computing resource in block 312, the application workload may be loaded in block 314 and a computing resource manager may be configured in block 316.

In some embodiments, such as embodiments with a virtualized compute node, the operations of block 318, which include blocks 310 through 316, may be performed by a computing resource manager for a compute node. In embodiments where the application execution manager also manages the individual physical computing resources, the operations of block 318 may be performed by the application execution manager.

Figure 4:
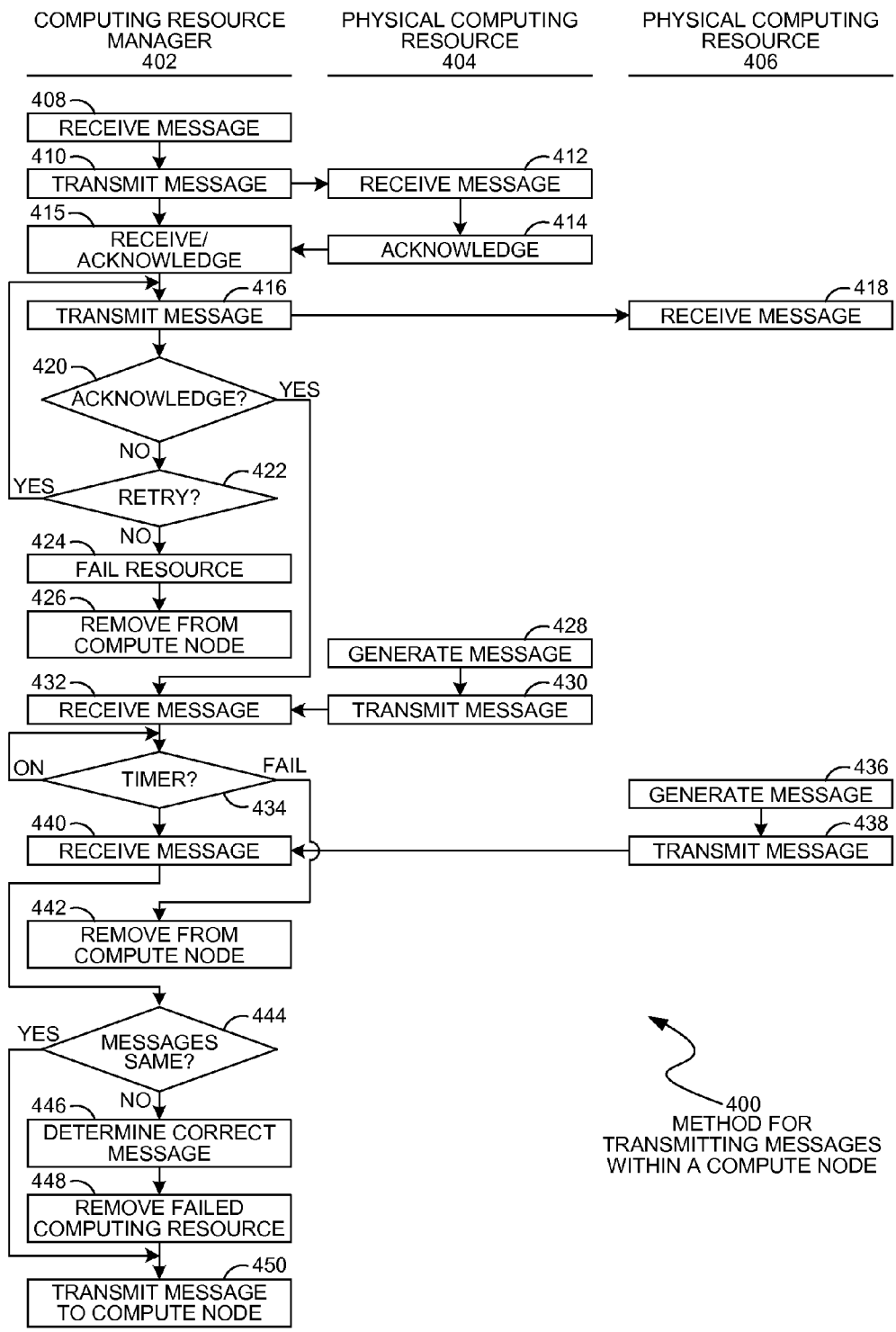
FIG. 4 is a timeline illustration of an embodiment showing a method for transmitting messages within a compute node.

FIG. 4 is a timeline illustration of an embodiment 400 showing a method for passing messages within a compute node. Embodiment 400 is an example of the operations that may be performed by a virtualized compute node or other embodiment where a single message may be passed to a compute node. In such an embodiment, the compute node may manage the various physical computing resources independently from an application execution manager.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The operations of a computing resource manager 402 are illustrated in the left hand column, while operations of a physical resource 404 are illustrated in the center column and operations of a physical resource 406 are illustrated in the right hand column. The operations illustrated in embodiment 400 represent operations performed within a single compute node that may operate within a message passing environment.

Embodiment 400 illustrates an embodiment with two physical computing resources. Other embodiments may have three, four, or more physical computing resources for a specific compute node.

A message may be received in block 408 for the compute node. The message may be processed by the various workloads operating on the physical computing resources 404 and 406.

The message may be transmitted in block 410 from the computing resource manager 402 to the physical computing resource 404, and may be received in block 412. An acknowledgment may be transmitted in block 414 and received by the computing resource manager 402 in block 415.

The operations of blocks 410 through 415 represent a message transmittal and acknowledgement that may occur under normal circumstances.

In block 416, the message may be passed from the computing resource manager 402 to the physical computing resource 406, where the message may be received in block 418. If the acknowledgement has not been received in block 420, the transmittal may be retried in block 422 and the process may return to block 416. The retry may be performed several times. If the retires fail in block 422, the resource may be declared failed in block 424 and the physical computing resource 406 may be removed from the compute node in block 426.

If the acknowledgement is received in block 420, the process may continue.

The operations of blocks 420 through 426 may represent a mechanism for detecting a failed physical computing resource. If the physical computing resource is determined to be failed, it may be removed from the compute node and may not receive or transmit any further messages.

When the messages are passed to the various physical computing resources, the physical computing resources may process the message with the executing workflows. At some point, the workflows may generate a message that may be passed to another compute node.

The physical computing resource 404 may generate a message in block 428 and may transmit the message in block 430 to the computer resource manger 402, which may receive the message in block 432.

When the first physical computing resource transmits a message to the computing resource manager, a timer may be started in block 434. At some point later, the physical computing resource 406 may generate a message in block 436 that may be transmitted in block 438, and may be received by the computing resource manager 402 in block 440. If the timer 434 expires prior to a predetermined time, the physical computing resource 406 may be removed from the compute node in block 442.

When the messages are received, the messages may be compared in block 444 to determine whether or not the messages are the same. Since both physical computing resources are operating the same workload with the same input messages, the output messages may be expected to be the same. When the messages are different in block 444, a correct message may be determined in block 446, the failed physical computing resource may be identified and removed from the compute node in block 448. If the messages are the same, or when the correct message is identified in block 446, the message may be transmitted to the intended compute node in block 450.

The operations of blocks 432 through 450 illustrate two mechanisms for identifying a failed physical computing resource. The first failure detection mechanism may detect failure when one of the physical computing resources fails to generate a message in a similar timeframe as another physical computing resource. The second failure detection mechanism may detect a failure when the messages received from the physical computing resources are not similar.

Figure 5:
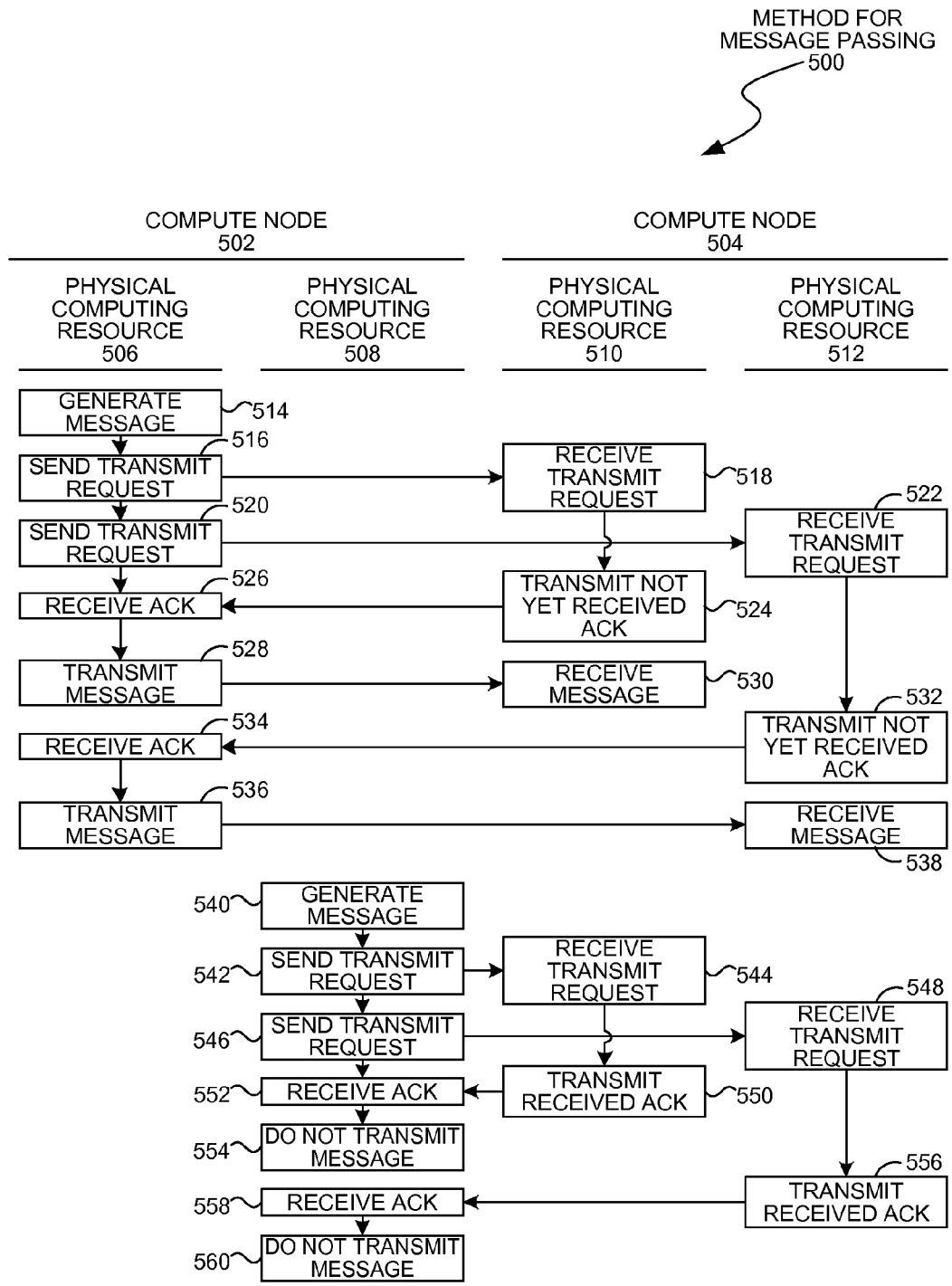
FIG. 5 is a timeline illustration of an embodiment showing a method for message passing.

FIG. 5 is a timeline illustration of an embodiment 500 showing a method for passing messages between two compute nodes. Embodiment 500 is an example of the operations that may be performed by a message passing environment when the various physical computing resources may be able to pass messages directly to other physical computing resources.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The operations of a compute node 502 are illustrated by the operations of physical computing resources 506 and 508, while the operations of a compute node 504 are illustrated by the operations of physical computing resources 510 and 512.

Embodiment 500 differs from embodiment 400 at least in that embodiment 400 has mechanisms passed between compute nodes, then messages are passed from a computing resource manager to the physical computing resources, while embodiment 500 allows each of the physical computing resources to pass messages to each of the physical computing resources associated with another compute node.

In block 514, physical computing resource 506 may generate a message and may send a transmit request in block 516 to physical computing resource 510, which may receive the transmit request in block 518. Physical computing resource 506 may also send a transmit request in block 520 to physical computing resource 512, which may receive the transmit request in block 522.

The transmit request may identify a message that the transmitting physical computing resource intends to transmit. The transmit request may not include the message payload, but may include an identifier for the message.

In block 524, the physical computing resource 510 may transmit an acknowledgement that indicates that the message had not been received. The acknowledgement may be received in block 526. The message may be transmitted in block 528 by the physical computing resource 506 and received in block 530 by the physical computing resource 510. Similarly, the physical computing resource 512 may transmit an acknowledgement in block 532 that indicates that the message had not been received. The acknowledgement may be received in block 534. The message may be transmitted in block 536 by the physical computing resource 506 and received in block 538 by the physical computing resource 512.

In block 540, the physical computing resource 508 may generate a message. The message in block 540 may be the same or similar message generated in block 514 by physical computing resource 506.

The physical computing resource 508 may send a transmit request in block 542 to physical computing resource 510, which may receive the request in block 544. Similarly, the physical computing resource 508 may send a transmit request in block 546 to physical computing resource 512, which may receive the request in block 548.

The transmit requests of blocks 542 and 546 may be the same or similar requests as blocks 516 and 520, and may identify the message of block 540 to be the same or similar to the message of block 514. Because the message has been received in blocks 530 and 538, the physical computing resource 510 may transmit a received acknowledgement in block 550, which may indicate that the message has already been received. The acknowledgement may be received in block 552 and the message may not be transmitted in block 554. Similarly, the physical computing resource 512 may transmit a received acknowledgement in block 556, which may indicate that the message has already been received. The acknowledgement may be received in block 558 and the message may not be transmitted in block 560.

The operations of embodiment 500 illustrate a message passing sequence where the physical computing resources may pass messages directly to other physical computing resources. Since there are duplicate physical computing resources, each of which may generate and transmit the same messages, each transmission may be preceded by transmitting the message identifier to determine whether or not the message has already been transmitted. The transmit request may be much smaller than the message with a full message payload, and the embodiment 500 may produce less network traffic than another embodiment where each physical computing resource transmitted a full message to each of the receiving compute node's physical computing resources.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a plurality of virtual compute nodes, each of the virtual compute nodes comprises at least two physical computing resources, each of the physical computing resources perform identical computing tasks for a virtual compute node;
an application manager that is configured to receive an application to execute, said application having a plurality of execution threads, each of said execution threads being operable on a different virtual computing node in the plurality of virtual compute nodes, said application further configured to use a message passing system to pass messages from one execution thread to another; and
an application execution environment that exposes said virtual compute nodes to the application, said application execution environment configured to:
receive, from the application manager:
a first execution thread of the parallel processing application; and
an identity of a first virtual compute node in the plurality of virtual compute nodes, the first virtual compute node comprises the at least two physical computing resources that are to execute the first execution thread;
receive a first message from a second virtual compute node executing a second execution thread of the application, the first message being addressed to the first virtual compute node;
provide the first message to the at least two physical computing resources of the first virtual compute node, each of the at least two physical computing resources executing the first execution thread for the application;
receive a second message from a first physical computing resource in the at least two physical computing resources, the second message based upon the first message, the second message having an address for a third virtual compute node; and
transfer the second message to the third virtual compute node.

2. The system of claim 1, said application execution environment further configured to:
detect that a first physical computing resource of the first virtual compute node is unavailable; and
remove said first physical computing resource from the first virtual compute node such that the first physical computing resource is no longer capable of receiving messages directed to the first virtual compute node.

3. The system of claim 1, said first virtual compute node having a computing resource manager that is configured to:
receive the first message for said first virtual compute node and pass said first message to the first application thread executing on said at least two physical computing resources.

4. The system of claim 3, said computing resource manager further configured to:
receive a third message from a second of said at least two physical computing resources and fail to transmit said third message, said third message having a work payload that is identical to a work payload of said second message.

5. The system of claim 4, further comprising at least one non-virtualized compute node.

6. The system of claim,
said application manager further configured to:
determine a number of virtual compute nodes to be assigned to said application;
identify physical computing resources to execute an execution thread and configure a computing resource manager for said physical computing resources; and
cause said execution threads to be started on each of said physical computing resources.

7. The system of claim 6, said computing resource manager being executed on each of said physical computing resources.

8. The system of claim 6, said computing resource manager being executed on a first physical computing resource and not on one of said at least two physical computing resources of the first virtual compute node.

9. The system of claim 8, said computing resource manager being executed on a physical computing resource that is not one of said at least two physical computing resources.

10. The system of claim 1, the physical computing resources being respective server computing devices.

11. A method for operating a first virtual compute node in a message passing environment for executing a parallel processing application, said method comprising:
receiving, from an application manager:
a first execution thread of the parallel processing application; and
an identity of at least two physical computing resources to execute the first execution thread, the first virtual compute node comprises the at least two physical computing resources;
receiving a first message from a second virtual compute node executing a second execution thread of the parallel processing application, the first message being addressed to said first virtual compute node;
providing the first message to the at least two physical computing resources of the first virtual compute node, each of said at least two physical computing resources executing the first execution thread for said parallel processing application;
receiving a second message from a first physical computing resource in the at least two physical computing resources, the second message based upon the first message, said second message having an address for a third virtual compute node; and
transferring said second message to said third virtual compute node.

12. The method of claim 11 further comprising:
receiving a third message from a second physical computing resource in the at least two physical computing resources, said third message having an address for said third virtual compute node;
determining that said third message and said second message are identical; and
failing to transmit said third message based upon the third message and the second message being identical.

13. The method of claim 11 further comprising:
receiving a third message from a second physical computing resource in the at least two physical computing resources, said third message having an address for said third compute node;
determining that said third message and said second message are different;

identifying that one of the first physical computing resource or the second computing resource has failed based upon said third message and said second message being different; and removing the one of the first physical computing resource or the second computing resource that has failed from the first virtual compute node.

14. The method of claim 13, the first physical computing resource being a first server computing device and the second physical computing resource being a second server computing device.

15. A system comprising:

multiple physical computing resources;

an application manager that is configured to receive an application to execute, said application having a plurality of workflow portions, each of said workflow portions being executable on a different virtual compute node amongst a first set of virtual compute nodes, said application further configured to use a message passing system to pass messages from one workflow portion to another;

an application execution environment that is configured to:

expose the first set of virtual compute nodes to the application, each of said virtual compute nodes executing a workflow portion of said application;

transmit communications from a first virtual compute node in the first set of virtual compute nodes to a second virtual compute node in the first set of virtual compute nodes;

for each of said virtual compute nodes:

provide at least two physical computing resources, each of said physical computing resources executing an identical workflow portion; and forward communications received by a virtual compute node to each of said physical computing resources associated with said virtual compute node.

16. The system of claim 15, one of said physical computing resources being designated a primary physical computing resource and a second of said physical computing resources being designated a duplicate physical computing resource.

17. The system of claim 15, said application execution environment further configured to:

detect that a third physical computing resource has become unavailable; and remove said third physical computing resource from receiving communications.

18. The system of claim 15, said application execution environment further configured to:

query each of said physical computing resources to determine whether or not each physical computing resource received a message, and send said message when said message had not been received.

19. The system of claim 18, said application execution environment further configured to:

detect a failed communication by:

setting a timer at a first communication attempt for a first message; and detecting expiration of said timer prior to detecting a successful receipt of said first message.

20. The system of claim 15, the multiple physical computing resources being servers in a data center.

* * * * *